3,219,455
BREAD AND ADDITIVE

Donald K. Dubois, Harbor Beach., Mich., assignor to Hercules Powder Company, Wilmington, Del., a corporation of Delaware
No Drawing. Filed July 11, 1963, Ser. No. 294,243
6 Claims. (Cl. 99—90)

This is a continuation-in-part of application, Serial No. 81,676, filed January 10, 1961, now abandoned.

The present invention relates to a bread additive and to an improved bread comprising same and more particularly to an improved bread having increased loaf volume, improved grain, texture and keeping qualities.

The term "bread" as used in the claims and elsewhere herein is intended to include any article of yeast-raised food made from flour by moistening, kneading and baking, as well as mixtures comprising the necessary ingredients for preparing any such article of food.

An object of the present invention is an improved bread additive. A further object is an improved bread comprising said additive. A still further object is an improved bread having increased loaf volume, improved grain, texture, and keeping qualities. The above and other objects will be more readily apparent from the description of this invention given hereinafter.

The above and other objects are accomplished according to the present invention by providing a bread additive comprising vital wheat gluten, a hydrophilic colloid and an oxidizing agent.

The following examples illustrate specific embodiments of the present invention but they are not intended to limit the invention beyond the scope of the appended claims. In the examples and elsewhere herein parts and percent are by weight unless otherwise indicated. All viscosities herein were measured with a Standard Brookfield Synchro-Lectric LVF viscometer on aqueous solutions at 25° C. of the concentrations specified.

The following Examples 1–17 in Tables 1 and 2 below were carried out using a sponge-dough bread baking procedure based on the official American Association of Cereal Chemists' sponge-dough method for determining the baking quality of bread flour. See Cereal Laboratory Methods, sixth edition (1957), page 55, published by the American Association of Cereal Chemists. Applicants made some modifications in this procedure. The modified procedure used was as follows:

EQUIPMENT AND APPARATUS (1) Hobart A–200 mixer with a McDuffy bowl and fork.
(2) Fermentation cabinet capable of maintaining a constant temperature of 82° F. and relative humidity of 78%.
(3) National sheeter (6-inch rolls) and molder.
(4) Proofing cabinet capable of maintaining a constant temperature of 96° F. and relative humidity of 78%.
(5) Fermentation bowls, porcelain, 9½" diameter, 5¼" depth, with close fitting lids.
(6) Baking pans, 4XXXX tin, No. F–192, top, 8½" x 4½"; bottom 7⅝" x 3⅝"; height 2¾". Pans are coated with silicone pan glaze.
(7) Rotating reel oven, capable of maintaining constant temperature of 425° F.
(8) Volumeter, pound loaf size, rape seed displacement.
(9) Compressimeter, with 215-gram cylinder.

FORMULA

[Percentages are based on total weight of flour used, in this instance, 1,000 grams]

|  | Sponge | | Dough | |
|---|---|---|---|---|
|  | Percent | Grams | Percent | Grams |
| Flour (Southwest Bakers patent) | 60 | 600 | 40 | 400 |
| Yeast (compressed) | 2 | 20 | | |
| Yeast food | 0.5 | 5 | | |
| Water [1] | (²) | (²) | (²) | (²) |
| Sugar | | | 6 | 60 |
| Salt | | | 2 | 20 |
| Shortening | | | 3 | 30 |
| Milk powder | | | 3 | 30 |
| Vital wheat gluten [1] | (²) | (²) | | |
| CMC-7HS [1] | (²) | (²) | | |
| Potassium bromate [1] | (²) | (²) | | |

[1] See specific examples in Tables 1 and 2 for exact amounts used. CMC is carboxymethylcellulose.
[2] Variable.

NOTE.—Compressed yeast is suspended in about 80 ml. of the sponge water. The balance of the water is cooled so that the dough will come from the mixer at approximately 80° F.

PROCEDURE

The dry ingredients of the sponge are placed in the mixer bowl and mixed for one minute. The yeast suspension, the potassium bromate dissolved in water, and the balance of the sponge water are added. The ingredients are mixed for one minute in low speed and two minutes in medium speed. The dough is removed from the mixing bowl, placed in a greased fermentation bowl and covered. The bowl is maintained at approximately 76° F. for four hours.

The remaining dry ingredients are then put into the mixing bowl along with the remaining water, and mixing is started in low speed. The sponge is divided into three parts and thrown into the bowl within thirty seconds after the mixing is started. After one minute, the ingredients are mixed in second speed to optimum dough development. The dough is removed from the mixer, placed in the fermentation bowl, covered, and maintained at approximately 76° F.

After 35 minutes, the dough is divided into three, 440-gram doughs which are covered, and maintained at approximately 80° F.

After 15 minutes, each dough is flattened and put through the sheeter 3 times with settings of %₃₂", ⅞₂" and %₃₂".

The flattened doughs are hand-rolled and placed in the molder to be turned until they are pan length and evenly rolled. Doughs are then placed in pans which are put in a proof cabinet at 95–98° F. and approximately 75% relative humidity. The doughs are proofed approximately 55 minutes. The actual time is determined by the time it takes a control dough, containing only normal white bread ingredients, to rise ¼" above the top of the pan.

Doughs are baked for 27 minutes at 420° F., then removed to a cooling rack for 15 minutes before obtaining the loaf volumes.

After 45 minutes total cooling time, the bread is weighed and stored in polyethylene bags.

After 48 hours and again at 96 hours, the bread is compared with the control loaf, and scored according to the following table:

| External characteristics: | Perfect Score |
|---|---|
| Loaf volume | 15 |
| Crust color | 5 |
| Symmetry | 5 |
| Evenness of bake | 5 |
| Internal characteristics: | |
| Texture | 15 |
| Grain | 10 |
| Crumb color | 10 |
| Aroma | 15 |
| Taste | 20 |
| | 100 |

The loaf volume score above is obtained from the following table:

| Loaf Volume, Ml. | | Points | Loaf Volume, Ml. | | Points |
|---|---|---|---|---|---|
| Min. | Max. | | Min. | Max. | |
| 2,500 | ------ | 15 | 2,100 | 2,149 | 7 |
| 2,450 | 2,499 | 14 | 2,050 | 2,099 | 6 |
| 2,400 | 2,449 | 13 | 2,000 | 2,049 | 5 |
| 2,350 | 2,399 | 12 | 1,950 | 1,999 | 4 |
| 2,300 | 2,349 | 11 | 1,900 | 1,949 | 3 |
| 2,250 | 2,299 | 10 | 1,850 | 1,899 | 2 |
| 2,200 | 2,249 | 9 | 1,800 | 1,849 | 1 |
| 2,150 | 2,199 | 8 | Below 1799 | | 0 |

External characteristics are scored by comparing the test loaf with a control loaf containing only the usual bread ingredients. After external characteristics are scored, the loaf is cut into four, 2-inch slices. Compressibility is measured with a compressimeter on the two inner slices, both sides of one slice, the outer side of the other slice being used. The compressibility is the depth, in millimeters, to which the weight sinks into the slice in 10 seconds, the three measurements being averaged.

Internal characteristics are then scored by comparing the appearance and feel of the crumb of the test loaf with that of the control.

In order to determine the effect of using other oxidizing agents in place of potassium bromate and the effect of other hydratable proteins in place of vital gluten, the foregoing examples were repeated using the oxidizing agents potassium iodide, ammonium persulfate and calcium bromate and the hydratable proteins egg white solids, sodium caseinate and soya flour. Surprisingly, the hydratable protein vital gluten was the only one found to give the synergistic effect of the present invention. However, the oxidizing agents gave substantially the same results as did the potassium bromate, the latter being slightly better.

From the foregoing examples it will be seen that the present invention gives a bread having surprisingly improved properties to a remarkable degree, particularly as to loaf volume which is a very important characteristic the baker strives for. Thus if one compares the poorest increase in bread volume, obtained by use of the three additives of the present invention with the best increase in bread volume obtained using only two of these ingredients, the increase obtained with the present invention is approximately 75% greater than the increase obtained with only two of these ingredients (for instance, this results from taking the increase over the control of Example 1 obtained with the pair of ingredients of Example 5 and comparing this with the increase over the control of Example 1 obtained with the three ingredients of Example 8 in accordance with the present invention). In the first instance, the increase is only 182 whereas in the second case the increase is 314, the latter being approximately 75% greater than the former.

Although the above examples represent various embodiments of the present invention, many variations may be made therein within the scope of this invention as defined in the claims attached to this application.

The amounts of vital wheat gluten, hydrophilic colloid and oxidizing agent used are critical in order to realize the benefits of the present invention. The amounts of these materials will vary somewhat depending upon the particular hydrophilic colloid and oxidizing agent employed. The amounts of these materials given herein are based on 1000 parts bread flour and also on using vital wheat gluten, carboxymethylcellulose and potassium bro-

*Table 1*

| Example | Parts | | | | Loaf Vol., ml. | Compressibility (mm.) | | Texture Score (15) | Total Score (100) |
|---|---|---|---|---|---|---|---|---|---|
| | Wheat Flour | Vital Wheat Gluten | Hydrophilic* Colloid | KBRO$_3$ | | 48 hr. | 96 hr. | | |
| 1 | 1,000 | None | None | None | 2,186 | 6.8 | 4.3 | 11.4 | 78.3 |
| 2 | 1,000 | 30 | None | None | 2,271 | 8.0 | 4.9 | 11.4 | 78.3 |
| 3 | 1,000 | None | 3 | None | 2,154 | 6.2 | 3.4 | 11.2 | 76.8 |
| 4 | 1,000 | None | None | 0.01 | 2,142 | 6.0 | 3.2 | 9.8 | 74.3 |
| 5 | 1,000 | 30 | 3 | None | 2,368 | 9.3 | 5.6 | 12.7 | 82.2 |
| 6 | 1,000 | 30 | None | 0.01 | 2,333 | 7.2 | 4.5 | 11.7 | 80.6 |
| 7 | 1,000 | None | 3 | 0.01 | 2,221 | 6.3 | 4.3 | 11.2 | 78.8 |
| 8 | 1,000 | 30 | 3 | 0.01 | 2,500 | 10.2 | 7.3 | 13.3 | 85.6 |
| 9 | 1,000 | 30 | 3 | 0.01 | 2,525 | 10.4 | 6.8 | 12.5 | 84.7 |
| 10 | 1,000 | 30 | 3 | 0.01 | 2,516 | 10.6 | 6.8 | 12.6 | 84.6 |

*In Examples 1–8 CMC–7HS was used (0.65–0.95 D.S. and 1,000–2,800 cps. viscosity at 1% and 25° C.). In Example 9 CMC–12H was used (1.20–1.40 D.S. and 100–300 cps. viscosity at 1% and 25° C.). In Example 10 sodium alginate was used.

*Table 2*

| Example | Parts | | | | Loaf Vol., ml. | Compressibility (mm.) | | Texture Score (15) | Total Score (100) |
|---|---|---|---|---|---|---|---|---|---|
| | Wheat Flour | Vital Wheat Gluten | Hydrophilic* Colloid | KBRO$_3$ | | 48 hr. | 96 hr. | | |
| 11 | 1,000 | None | None | None | 2,186 | 6.8 | 4.3 | 11.4 | 78.3 |
| 12 | 1,000 | 30 | None | None | 2,271 | 8.0 | 4.9 | 11.4 | 78.3 |
| 13 | 1,000 | None | 3 | None | 2,154 | 6.2 | 3.4 | 11.2 | 76.8 |
| 14 | 1,000 | None | None | 0.02 | 2,208 | 5.8 | 3.6 | 10.1 | 74.8 |
| 15 | 1,000 | 30 | None | 0.02 | 2,346 | 8.8 | 5.4 | 12.4 | 80.1 |
| 16 | 1,000 | None | 3 | 0.02 | 2,244 | 7.3 | 4.3 | 11.6 | 79.1 |
| 17 | 1,000 | 30 | 3 | 0.02 | 2,488 | 9.7 | 6.2 | 13.0 | 85.2 |

*In Examples 11–17 CMC–7HS was used (0.65–0.95 D.S. and 1,000–2,800 cps. viscosity at 1% and 25° C.)

mate. About 20–30 parts vital wheat gluten gives good results. Below about 20 parts vital wheat gluten the bread volume becomes undesirably low, whereas above about 30 parts the bread grain becomes poorer (i.e., more open) and the crumb color becomes more off-white. About 3–5 parts of hydrophilic colloid gives good results. Below about 3 parts hydrophilic colloid both the bread volume and texture become undesirably low, whereas above about 5 parts the bread volume becomes undesirably low. About 0.01–0.025 part oxidizing agent gives good results. The amount of oxidizing agent which may be used to give the best results is somewhat dependent on the amount of vital wheat gluten employed. In general, the larger amounts of oxidizing agent will be used in combination with the larger amounts of vital wheat gluten, and vice versa.

The present invention is applicable to hydrophilic colloids in general. These include, by way of example, cellulose derivatives such as carboxyalkyl cellulose ethers, e.g. carboxymethylcellulose, carboxyethyl cellulose, carboxypropyl cellulose; alkyl cellulose ethers, e.g. methyl cellulose; carboxyalkyl hydroxyalkyl cellulose ethers, e.g. carboxymethyl hydroxyethyl cellulose, carboxyethyl hydroxyethyl cellulose; hydroxyalkyl cellulose ethers, e.g. hydroxyethyl cellulose, hydroxypropyl cellulose; dextran; starch derivatives such as carboxyalkyl starch ethers, e.g. carboxymethyl starch; hydroxyalkyl starch ethers, e.g. hydroxypropyl starch; and natural gums, e.g. guar gum, locust gum, karaya gum, gum arabic, agar agar, Irish moss, carrageenin, algin, sodium alginate, pectin, quince seed gum, psyllium seed gum, gum tragacanth.

This invention is applicable to oxidizing agents in general. The more practical ones include, for example, potassium bromate, calcium bromate, potassium iodate, calcium iodate, potassium persulfate, ammonium persulfate and calcium peroxide.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. A bread additive comprising about 20–30 parts vital wheat gluten, about 3–5 parts hydrophilic colloid, and about 0.01–0.025 part oxidizing agent.
2. The bread additive of claim 1 wherein the hydrophilic colloid is carboxymethylcellulose.
3. The bread additive of claim 1 wherein the oxidizing agent is potassium bromate.
4. An improved bread made from a dough comprising about 20–30 parts vital wheat gluten, about 3–5 parts hydrophilic colloid, and about 0.01–0.025 part oxidizing agent per 1000 parts bread flour.
5. The improved bread of claim 4 wherein the hydrophilic colloid is carboxymethylcellulose.
6. The improved bread of claim 4 wherein the oxidizing agent is potassium bromate.

References Cited by the Examiner

UNITED STATES PATENTS

| | | | |
|---|---|---|---|
| 1,524,783 | 2/1925 | Curtner | 99—90 |
| 1,657,116 | 1/1928 | Fiske | 99—91 |
| 2,158,392 | 5/1939 | Ament | 99—90 |
| 2,797,212 | 6/1957 | Miley et al. | 99—91 |
| 2,863,771 | 12/1958 | Ferrara | 99—91 |
| 2,983,613 | 5/1961 | Bohn | 99—91 |
| 2,992,111 | 7/1961 | Ferrari | 99—91 |
| 3,097,946 | 7/1963 | Menzi | 99—90 |

FOREIGN PATENTS 675,657   5/1939   Germany.

OTHER REFERENCES

The Bakers Digest, June 1958, vol. 32, No. 3 (pages 42–45 and 73).

A. LOUIS MONACELL, *Primary Examiner.*

BEATRICE H. STRIZAK, *Examiner.*